United States Patent
Triller et al.

(10) Patent No.: US 8,354,356 B2
(45) Date of Patent: Jan. 15, 2013

(54) DMC CATALYSTS, METHOD FOR THE PRODUCTION THEREOF AND USE THEREOF

(75) Inventors: Michael Triller, Ilvesheim (DE); Matthias Schopohl, Ludwigshafen (DE); Veit Stegmann, Mannheim (DE); Thomas Ostrowski, Mannheim (DE)

(73) Assignee: BASF SE, Ludwigshafen (DE)

( * ) Notice: Subject to any disclaimer, the term of this patent is extended or adjusted under 35 U.S.C. 154(b) by 551 days.

(21) Appl. No.: 12/525,828

(22) PCT Filed: Jan. 31, 2008

(86) PCT No.: PCT/EP2008/051190
§ 371 (c)(1),
(2), (4) Date: Aug. 5, 2009

(87) PCT Pub. No.: WO2008/095853
PCT Pub. Date: Aug. 14, 2008

(65) Prior Publication Data
US 2010/0029961 A1    Feb. 4, 2010

(30) Foreign Application Priority Data

Feb. 5, 2007  (EP) .................................. 07101738

(51) Int. Cl.
*B01J 27/26* (2006.01)
*B01J 31/26* (2006.01)
*C07C 41/02* (2006.01)
*C07D 301/00* (2006.01)

(52) U.S. Cl. ......... 502/150; 502/200; 568/679; 549/539

(58) Field of Classification Search .................. None
See application file for complete search history.

(56) References Cited

U.S. PATENT DOCUMENTS

| | | | |
|---|---|---|---|
| 3,278,457 A | 10/1966 | Milgrom | |
| 4,355,188 A * | 10/1982 | Herold et al. | 568/620 |
| 5,783,513 A | 7/1998 | Combs et al. | |
| 6,429,166 B1 | 8/2002 | Wehmeyer | |
| 6,586,566 B1 * | 7/2003 | Hofmann et al. | 528/425 |
| 6,869,905 B1 | 3/2005 | Dexheimer | |

FOREIGN PATENT DOCUMENTS

| | | |
|---|---|---|
| DE | 102 02 838 | 8/2003 |
| JP | 2003 103177 | 4/2003 |
| WO | 2004 105944 | 12/2004 |
| WO | 2006 117364 | 11/2006 |

OTHER PUBLICATIONS

Computer-generated English translation of JP 2003-103177, published Apr. 2003, pp. 1-6 and abstract.*
U.S. Appl. No. 12/811,100, filed Jun. 29, 2010, Beste, et al.
Clavel, Guylhaine et al., "Synthesis of Cyano-Bridged Magnetic Nanoparticles Using Room-Temperature Ionic Liquids", Chem. Eur. J., vol. 12, No. 14, pp. 3798-3804, (May 3, 2006).
Poole, Colin F. "Chromatographic and spectroscopic methods for the determination of solvent properties of room temperature ionic liquids", Journal of Chromatography A, vol. 1037, No. 1-2, pp. 49-82, (May 28, 2004).
Kim, II et al., "Tuning of the activity and induction period of double metal cyanide catalyzed ring-opening polymerizations of propylene oxide by using ionic liquids", Catalysis Today, Elsevier, vol. 131, No. 1-4, pp. 541-547, (2008).

* cited by examiner

Primary Examiner — Rosalynd Keys
(74) Attorney, Agent, or Firm — Oblon, Spivak, McClelland, Maier & Neustadt, L.L.P.

(57) ABSTRACT

The invention relates to a process for preparing DMC catalysts by reaction of cyanometalate compounds with metal salts, wherein the reaction is carried out in ionic liquids as solvents or suspension media.

22 Claims, No Drawings

DMC CATALYSTS, METHOD FOR THE PRODUCTION THEREOF AND USE THEREOF

The invention relates to a process for preparing DMC catalysts.

Multimetal cyanide compounds, frequently also referred to as DMC catalysts, have been known for a long time and have been widely described in the literature, for example in U.S. Pat. Nos. 3,278,457 and in 5,783,513.

Such compounds are preferably used as catalysts for preparing polyether alcohols by addition of alkylene oxides onto H-functional starter substances. These processes, too, are known.

The DMC catalysts are usually prepared by reacting the aqueous solution of a metal salt with the aqueous solution of a cyanometalate, frequently in the presence of at least one organic ligand. The multimetal cyanide compound obtained in this way is separated off, washed and dried.

Water is a catalyst poison and in the case of the DMC catalysts prepared in the manner described has to be removed as completely as possible in complicated drying steps. The requirement for complete removal of water makes the production process complicated and expensive.

To eliminate this deficiency, the preparation of the DMC catalysts can be carried out in a nonaqueous medium.

Thus, JP 2003 103177 describes the preparation of DMC catalysts from metal halides ($ZnX_2$) and a cyanometalate in water-free organic solvents, e.g. alcohols, ethers, amides, nitrites, ketones, aldehydes or sulfides. The objective is the preparation of water-free DMC catalysts which have a higher activity which, in particular, does not fluctuate with the residual water content which inevitably occurs in the conventional preparation. The DMC catalysts prepared in this way are used for the addition of alkylene oxides having at least three carbon atoms onto H-functional starter substances.

U.S. Pat. No. 6,429,166 describes the preparation of DMC catalysts from a transition metal salt and a hexacyanometalic acid in low-boiling organic solvents. After precipitation of the DMC in the organic solvent, the suspension formed is combined with a starter alcohol and the organic solvent is removed, preferably by distillation. Disadvantages of this process are, in particular, that the distillation is energy-intensive and requires a high level of safety precautions because of the risk of explosion and fire. Furthermore, the DMC catalyst is not isolated but is always present as a relatively dilute suspension. This makes it necessary to prepare the catalyst where it is also to be used, since transport of the dilute catalyst suspensions is associated with increased costs and an increased outlay for safety precautions. In addition, a catalyst suspension cannot be stored readily without the catalyst settling out. The catalyst suspension therefore has to be stirred before use, but it cannot be guaranteed that the sediment can be suspended completely homogeneously or can be stirred up at all.

U.S. Pat. No. 6,869,905 B1 describes the preparation of DMC catalysts from two transition metal salts of which neither is a complex cyanometalate and alkali metal cyanide in nonaqueous solution. Either polar protic solvents such as alcohols or carboxylic acids or polar aprotic solvents such as ketones, nitrites, formamides or sulfoxides are used. The use of alkali metal cyanides likewise requires increased safety precautions.

WO 2006/117364 describes the preparation of DMC catalysts by reacting cyanometallic acid with a metal salt $MR_w$, or $MR_wY_v$, where R is the anion of a very weak acid ($pK_a >= 20$) and w is at most 1. All zinc salts which are customarily used, e.g. zinc chloride, zinc oxide or zinc carboxylates, are thus ruled out as starting materials. The metal salts used are usually zinc salts such as diethylzinc. The DMC catalysts prepared in this way are preferably used for the reaction of H-functional starters, in particular monofunctional alcohols, with alkylene oxides.

A further problem in the preparation of polyether alcohols using DMC catalysts is that the addition reaction of pure ethylene oxide is extraordinarily difficult and usually leads to unusable products. Since polyether alcohols having end blocks of pure ethylene oxide are necessary for many cases of use in the production of polyurethanes, there is a need for such products also to be prepared by means of DMC catalysts.

WO 2004/105944 describes a process for preparing a DMC catalyst by precipitation from an emulsion. The precipitation emulsion comprises aqueous metal salt solution (preferably zinc chloride) and aqueous hexacyanocobaltic acid solution in a water-insoluble solvent, for example hydrocarbons or higher alcohols. The use of these catalysts is said to make the addition of ethylene oxide at the end of the chain possible.

A disadvantage in this preparation of the DMC catalysts is the long reaction time of about 20 hours without work-up. An additional disadvantage is the huge reaction volumes necessary for precipitation from microemulsions. Compared to a conventional DMC synthesis, the preparation of a microemulsion represents a further process step. In addition, precipitation from an emulsion necessitates the use of organic solvents both for preparing and for breaking the emulsion and also an increased outlay for safety precautions and waste disposal.

It was an object of the present invention to develop a process for preparing the DMC catalysts, in which no water has to be used, which is simple to carry out and makes do without additional process steps and in which DMC catalysts which have a high catalytic activity are formed. Furthermore, the addition reaction of ethylene oxide should be possible in the preparation of polyether alcohols when using these catalysts.

The object has surprisingly been able to be achieved by the use of ionic liquids as solvents or suspension media in the preparation of the DMC catalysts.

In Clavel et al., "Synthesis of Cyano-Bridged Magnetic Nanoparticles using Room-temperature Ionic Liquids", Chem. Eur. J. 2006, 12, 3798-3803, describe a process for preparing magnetic nanomaterials which are present in colloidal suspensions. Here, a metal salt was reacted with a cyanometalate salt in an ionic liquid comprising tetrafluoroborate as anion. However, tetrafluoroborate-comprising compounds are not very suitable for multimetal cyanide compounds used as catalysts for the addition reaction of alkylene oxides. Separation of the particles formed in this process from the ionic liquid is not intended and also not possible. Such colloidal suspensions of multimetal cyanide compounds in ionic liquids are therefore not suitable for the use of the multimetal cyanide compounds as catalysts for the addition reaction of alkylene oxides. Furthermore, the tetrafluoroborate anion is not stable and can decompose in the presence of appropriate nucleophiles, for example traces of water, or at elevated temperature into fluoride and $BF_3$ which have adverse effects in alkoxylation reactions. Fluoride is undesirable as impurity because of its toxicity, while $BF_3$ can act as alkoxylation catalyst and catalyze undesirable secondary reactions.

The invention accordingly provides a process for preparing DMC catalysts by reaction of cyanometalate compounds with metal salts, wherein the reaction is carried out in ionic liquids as solvents or suspension media.

The invention further provides the DMC catalysts prepared by the process of the invention.

The invention further provides for the use of the DMC catalysts prepared by the process of the invention as catalysts for the preparation of polyether alcohols by addition of alkylene oxides onto H-functional starter substances.

The invention further provides a process for preparing polyether alcohols by catalytic addition of alkylene oxides onto H-functional starter substances, wherein the DMC catalysts of the invention are used as catalysts.

The invention further provides a process for preparing polyether alcohols by catalytic addition of alkylene oxides onto H-functional starter substances, wherein the DMC catalysts of the invention are used as catalysts and pure ethylene oxide is used as alkylene oxide in at least part of the addition reaction.

For the purposes of the present invention, ionic liquids are compounds which have at least one cationic center and at least one anionic center, in particular at least one cation and at least one anion, with one of the ions, in particular the cation, being organic.

Ionic liquids are, for the purposes of the present invention, preferably (A) salts of the general formula (I)

$$[A]_n^+[Y]^{n-} \quad (1),$$

where n is 1, 2, 3 or 4, $[A]^+$ is a quaternary ammonium cation, an oxonium cation, a sulfonium cation or a phosphonium cation and $[Y]^{n-}$ is a monovalent, divalent, trivalent or tetravalent anion;

(B) mixed salts of the general formulae (II)

$$[A^1]^+[A^2]^+[Y]^{n-} \quad (IIa),$$

where n=2;

$$[A^1]^+[A^2]^+[A^3]^+[Y]^{n-} \quad (IIb),$$

where n=3; or $$[A^1]^+[A^2]^+[A^3]^+[A^4]^+[Y]^{n-} \quad (IIc),$$

where n=4,
where $[A^1]^+$, $[A^2]^+$, $[A^3]^+$ and $[A^4]^+$ are selected independently from among the groups mentioned for $[A]^+$ and $[Y]^{n-}$ is as defined under (A); or (C) mixed salts of the general formulae (III)

$$[A^1]^+[A^2]^+[A^3]^+[M^1]^+[Y]^{n-} \quad (IIa),$$

where n=4;

$$[A^1]^+[A^2]^+[M^1]^+[M^2]^+[Y]^{n-} \quad (IIIb),$$

where n=4;

$$[A^1]^+[M^1]^+[M^2]^+[M^3]^+[Y]^{n-} \quad (IIIc),$$

where n=4;

$$[A^1]^+[A^2]^+[M^1]^+[Y]^{n-} \quad (IIId),$$

where n=3;

$$[A^1]^+[M^1]^+[M^2]^+[Y]^{n-} \quad (IIIe),$$

where n=3;

$$[A^1]^+[M^1]^+[Y]^{n-} \quad (IIIf),$$

where n=2;

$$[A^1]^+[A^2]^+[M^4]^{2+}[Y]^{n-} \quad (IIIg),$$

where n=4;

$$[A^1]^+[M^1]^+[M^4]^{2+}[Y]^{n-} \quad (IIIh),$$

where n=4;

$$[A^1]^+[M^5]^{3+}[y]^{n-} \quad (IIIi),$$

where n=4; or $$[A^1]^+[M^4]^{2+}[y]^{n-} \quad (IIIj),$$

where n=3,
where $[A^1]^+$, $[A^2]^+$ and $[A^3]^+$ are selected independently from among the groups mentioned for $[A]^+$, $[Y]^{n-}$ is as defined under (A) and $[M^1]^+$, $[M^2]^+$, $[M^3]^+$ are monovalent metal cations, $[M^4]^{2+}$ is a divalent metal cation and $[M^5]^{3+}$ is a trivalent metal cation.

The ionic liquids preferably have a melting point of less than 180° C. Further preference is given to the melting point being in the range from −50° C. to 150° C., more preferably in the range from −20° C. to 120° C. and even more preferably from −20° C. to <10° C.

Compounds which are suitable for forming the cation [A] of ionic liquids are, for example, known from DE 102 02 838 A1. Such compounds can comprise oxygen, phosphorus, sulfur or in particular nitrogen atoms, for example at least one nitrogen atom, preferably from 1 to 10 nitrogen atoms, particularly preferably from 1 to 5, very particularly preferably from 1 to 3 and in particular 1 or 2, nitrogen atoms. If appropriate, further heteroatoms such as oxygen, sulfur or phosphorus atoms can also be comprised. The nitrogen atom is a suitable carrier of the positive charge in the cation of the ionic liquid from which a proton or an alkyl radical can be transferred in equilibrium to the anion in order to produce an electrically neutral molecule.

If the nitrogen atom is the carrier of the positive charge in the cation of the ionic liquid, a cation can firstly be produced by quaternization of the nitrogen atom of, for instance, an amine or nitrogen heterocycle in the synthesis of ionic liquids. The quaternization can be effected by alkylation of the nitrogen atom. Depending on the alkylation reagent used, salts with different anions are obtained. In cases in which it is not possible to form the desired anion directly in the quaternization, this can be achieved in a further synthesis step. For example, proceeding from an ammonium halide, the halide can be reacted with a Lewis acid, with a complex anion being formed from the halide and the Lewis acid. An alternative is replacement of a halide ion by the desired anion. This can be achieved by addition of a metal salt with precipitation of the metal halide formed, by means of an ion exchanger or by displacement of the halide ion by a strong acid (with liberation of the hydrohalic acid). Suitable processes are described, for example, in Angew. Chem. 2000, 112, pp. 3926-3945, and the references cited therein.

Suitable alkyl radicals by means of which, for example, the nitrogen atom in the amines or nitrogen heterocycles can be quaternized are $C_1$-$C_{18}$-alkyl, preferably $C_1$-$C_{10}$-alkyl, particularly preferably $C_1$-$C_6$-alkyl and very particularly preferably methyl. The alkyl group can be unsubstituted or have one more identical or different substituents.

As cations, preference is given to using compounds which comprise at least one five- or six-membered heterocycle, in particular a five-membered heterocycle, which has at least one nitrogen atom and, if appropriate, an oxygen or sulfur atom, particular preference is given to compounds which comprise at least one five- or six-membered heterocycle which has one, two or three nitrogen atoms and a sulfur or oxygen atom, and very particular preference is given to those having two nitrogen atoms. Further preference is given to aromatic heterocycles such as pyridinium, pyridazinium, pyrimidinium, pyrazinium, imidazolium, pyrazolium, pyrazolinium, imidazolium, thiazolium, oxazolium, pyrrolidinium and imidazolidinium.

Among these compounds, preference is given to cations which have a molecular weight of less than 1000 g/mol, very particularly preferably less than 500 g/mol and in particular less than 250 g/mol.
Furthermore, preference is given to cations selected from among the compounds of the formulae (IVa) to (IVw),
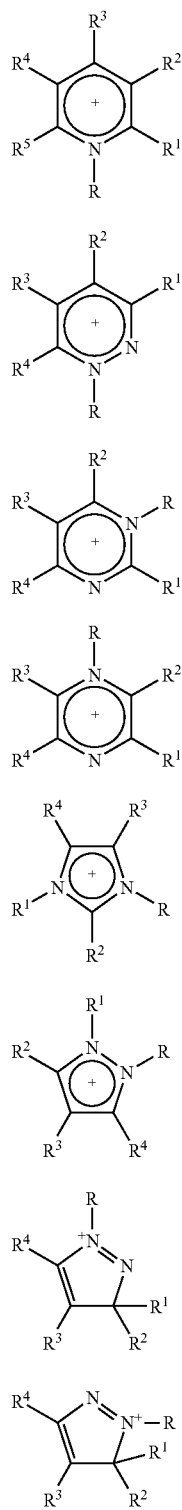
(IVa)
(IVb)
(IVc)
(IVd)
(IVe)
(IVf)
(IVg)
(IVg')
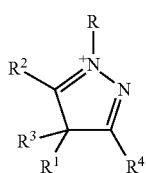
(IVh)
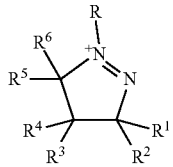
(IVi)
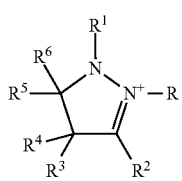
(IVj)
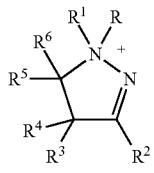
(IVj')
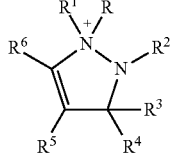
(IVk)
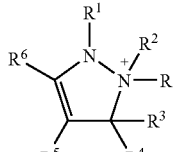
(IVk')
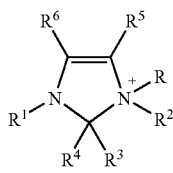
(IVl)
(IVm)
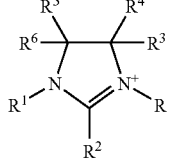
(IVm')

-continued

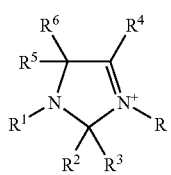 (IVn)

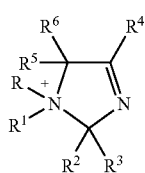 (IVn')

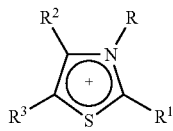 (IVo)

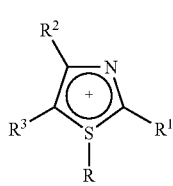 (IVo')

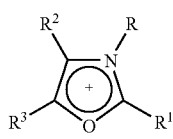 (IVp)

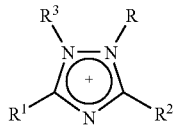 (IVq)

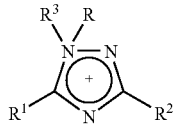 (IVq')

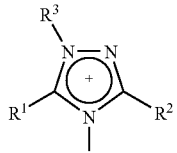 (IVq")

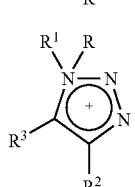 (IVr)

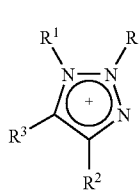 (IVr')

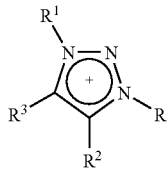 (IVr")

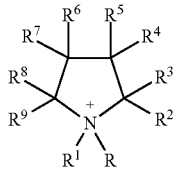 (IVs)

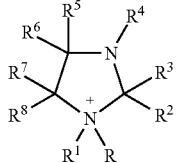 (IVt)

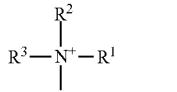 (IVu)

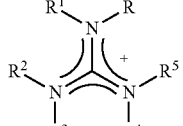 (IVv)

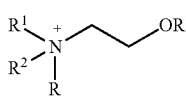 (IVw)

and oligomers comprising these structures.

Further suitable cations are compounds of the general formulae (IVx) and (IVy)

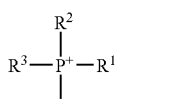 (IVx)

 (IVy)

and oligomers comprising these structures.

In the abovementioned formulae (IVa) to (IVy), the radical R is hydrogen, a carbon-comprising organic, saturated or unsaturated, acyclic or cyclic, aliphatic, aromatic or araliphatic radical which has from 1 to 20 carbon atoms and may be unsubstituted or interrupted or substituted by from 1 to 5 heteroatoms or functional groups; and the radicals $R^1$ to $R^9$ are each, independently of one another, hydrogen, a sulfo group or an organic, saturated or unsaturated, acyclic or cyclic, aliphatic, aromatic or araliphatic radical which has from 1 to 20 carbon atoms and may be unsubstituted or interrupted or substituted by from 1 to 5 heteroatoms or functional groups, where the radicals $R^1$ to $R^9$ which are bound to a carbon atom (and not to a heteroatom) in the abovementioned formulae (IV) may also be halogen or a functional group; or two adjacent radicals $R^1$ to $R^9$ together form a divalent carbon-comprising organic, saturated or unsaturated, acyclic or cyclic, aliphatic, aromatic or araliphatic radical which has from 1 to 30 carbon atoms and may be unsubstituted or interrupted or substituted by from 1 to 5 heteroatoms or functional groups.

In the definitions of the radicals R and $R^1$ to $R^9$, possible heteroatoms are in principle all heteroatoms which are able to formally replace a —$CH_2$—, —CH=, —C≡ or =C=group. If the carbon-comprising radical comprises heteroatoms, preference is given to oxygen, nitrogen, sulfur, phosphorus and silicon. As preferred groups, mention may be made of, in particular —O—, —S—, —SO—, —$SO_2$—, —NR'—, —N=, —PR'—, —$PR'_2$ and —$SiR'_2$—, where the radicals R' are in each case the remaining part of the carbon-comprising radical. In cases in which the radicals $R^1$ to $R^9$ in the abovementioned formulae (IV) are bound to a carbon atom (and not to a heteroatom), they can also be bound directly via the heteroatom.

Possible functional groups are in principle all functional groups which can be bound to a carbon atom or a heteroatom. Examples of suitable groups are —OH (hydroxy), =O (in particular as a carbonyl group), —$NH_2$ (amino), =NH (imino), —COOH (carboxy), —$CONH_2$ (carboxamide), —$SO_3H$ (sulfo) and —CN (cyano). Functional groups and heteroatoms can also be directly adjacent, so that combinations of a plurality of adjacent atoms, for instance —O— (ether), —S-(thioether), —COO— (ester), —CONH— (secondary amide) or —CONR'— (tertiary amide), are also comprised, for example di($C_1$-$C_4$-alkyl)amino, $C_1$-$C_4$-alkyloxycarbonyl or $C_1$-$C_4$-alkyloxy.

Preferred halogens are fluorine, chlorine, bromine and iodine.

The radical R is preferably
unbranched or branched $C_1$-$C_{18}$-alkyl which may be unsubstituted or substituted by one or more hydroxy, halogen, phenyl, cyano, $C_1$-$C_6$-alkoxycarbonyl and/or sulfonic acid groups and has a total of from 1 to 20 carbon atoms, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, 2-hydroxyethyl, benzyl, 3-phenylpropyl, 2-cyanoethyl, 2-(methoxycarbonyl)ethyl, 2-(ethoxycarbonyl)ethyl, 2-(n-butoxycarbonyl)ethyl, trifluoromethyl, difluoromethyl, fluoromethyl, pentafluoroethyl, heptafluoropropyl, heptafluoroisopropyl, nonafluorobutyl, nonafluoroisobutyl, undecylfluoropentyl, undecylfluoroisopentyl, 6-hydroxyhexyl and propylsulfonic acid;
a radical derived from glycols, butylene glycols and their oligomers having from 1 to 100 units and a hydrogen or a $C_1$-$C_8$-alkyl as end groups, for example $R^AO$—($CHR^B$—$CH_2$—O$)_n$—$CHR^B$—$CH_2$— or $R^AO$($CH_2CH_2CH_2CH_2O)_n$—$CH_2CH_2CH_2CH_2O$— where $R^A$ and $R^B$ are preferably each hydrogen, methyl or ethyl and n is preferably from 0 to 3, in particular 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxamidecyl and 3,6,9,12-tetraoxatetradecyl;
vinyl; and
N,N-di-$C_1$-$C_6$-alkylamino, for example N,N-dimethylamino and N,N-diethylamino.

The radical R is particularly preferably unbranched and unsubstituted $C_1$-$C_{18}$-alkyl, for example methyl, ethyl, 1-propyl, 1-butyl, 1-pentyl, 1-hexyl, 1-heptyl, 1-octyl, 1-decyl, 1-dodecyl, 1-tetradecyl, 1-hexadecyl, 1-octadecyl, in particular methyl, ethyl, 1-butyl and 1-octyl, or $CH_3O$—($CH_2CH_2O)_n$—$CH_2CH_2$— and $CH_3CH_2O$—($CH_2CH_2O)_n$—$CH_2CH_2$— where n is 0 to 3.

Preferences is given to the radicals $R^1$ to $R^9$ each being, independently of one another,
hydrogen;
halogen;
a functional group, in particular one as mentioned above;
$C_1$-$C_{18}$-alkyl which may optionally be substituted by functional groups, aryl, alkyl, aryloxy, alkyloxy, halogen, heteroatoms and/or heterocycles and/or interrupted by one or more oxygen and/or sulfur atoms and/or one or more substituted or unsubstituted imino groups;
$C_2$-$C_{18}$-alkenyl which may optionally be substituted by functional groups, aryl, alkyl, aryloxy, alkyloxy, halogen, heteroatoms and/or heterocycles and/or interrupted by one or more oxygen and/or sulfur atoms and/or one or more substituted or unsubstituted imino groups;
$C_6$-$C_{12}$-aryl which may optionally be substituted by functional groups, aryl, alkyl, aryloxy, alkyloxy, halogen, heteroatoms and/or heterocycles;
$C_5$-$C_{12}$-cycloalkyl which may optionally be substituted by functional groups, aryl, alkyl, aryloxy, alkyloxy, halogen, heteroatoms and/or heterocycles;
$C_5$-$C_{12}$-cycloalkenyl which may optionally be substituted by functional groups, aryl, alkyl, aryloxy, alkyloxy, halogen, heteroatoms and/or heterocycles; or
a five- to six-membered, oxygen-, nitrogen- and/or sulfur-comprising heterocycle which may optionally be substituted by functional groups, aryl, alkyl, aryloxy, alkyloxy, halogen, heteroatoms and/or heterocycles; or
two adjacent radicals together form
an unsaturated, saturated or aromatic ring which may optionally be substituted by functional groups, aryl, alkyl, aryloxy, alkyloxy, halogen, heteroatoms and/or heterocycles and may optionally be interrupted by one or more oxygen and/or sulfur atoms and/or one or more substituted or unsubstituted imino groups.

$C_1$-$C_{18}$-Alkyl which may optionally be substituted by functional groups, aryl, alkyl, aryloxy, alkyloxy, halogen, heteroatoms and/or heterocycles is preferably methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, butyl, heptyl, octyl, 2-etylhexyl, 2,4,4-trimethylpentyl, 1,1,3,3-tetramethylbutyl, 1-nonyl, 1-decyl, 1-undecyl, 1-dodecyl, 1-tridecyl, 1-tetradecyl, 1-pentadecyl, 1-hexadecyl, 1-heptadecyl, 1-octadecyl, cyclopentylmethyl, 2-cyclopentylethyl, 3-cyclopentylpropyl, cyclohexylmethyl, 2-cyclohexylethyl, 3-cyclohexylpropyl, benzyl (phenylmethyl), diphenylmethyl (benzhydryl), triphenylmethyl, 1-phenylethyl, 2-phenylethyl, 3-phenylpropyl, α,α-dimethylbenzyl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)ethyl, methoxy, ethoxy, formyl, 1,3-dioxolan-2-yl, 1,3-dioxan-2-yl, 2-methyl-1,3-dioxolan-2-yl, 4-methyl-1,3-dioxolan-2-yl, 2-hydroxyethyl, 2-hydroxypropyl, 3-hydroxypropyl, 4-hydroxybutyl, 6-hydroxyhexyl, 2-aminoethyl, 2-aminopropyl, 3-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl, 6-ethoxyhexyl, acetyl, $C_nF_{2(n-a)+(1-b)}H_{2a+b}$ where n is from 1 to 30, $0 \leq a \leq n$ and b=0 or 1 (for example $CF_3$, $C_2F_5$, $CH_2CH_2$—$C_{(n-2)}F_{2(n-2)+1}$, $C_6F_{13}$, $C_8F_{17}$, $C_{10}F_{21}$, $C_{12}F_{25}$), chloromethyl, 2-chloroethyl, trichloromethyl, 1,1-dimethyl-2-chloroethyl, methoxymethyl, 2-butoxyethyl, diethoxymethyl, diethoxyethyl, 2-isopropoxyethyl, 2-butoxypropyl, 2-octyloxyethyl, 2-methoxyisopropyl, 2-(methoxycarbonyl)ethyl, 2-(ethoxycarbonyl)ethyl, 2-(n-butoxycarbonyl)ethyl, butylthiomethyl, 2-dodecylthioethyl, 2-phenylthioethyl, 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-dioxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-dioxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

$C_2$-$C_{18}$-Alkenyl which may optionally be substituted by functional groups, aryl, alkyl, aryloxy, alkyloxy, halogen, heteroatoms and/or heterocycles and/or interrupted by one or more oxygen and/or sulfur atoms and/or one or more substituted or unsubstituted imino groups is preferably vinyl, 2-propenyl, 3-butenyl, cis-2-butenyl, trans-2-butenyl or $C_nF_{2(n-a)-(1-b)}H_{2a-b}$ where $n \leq 30$, $0 \leq a \leq n$ and b=0 or 1.

$C_6$-$C_{12}$-Aryl which may optionally be substituted by functional groups, aryl, alkyl, aryloxy, alkyloxy, halogen, heteroatoms and/or heterocycles is preferably phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2-nitrophenyl, 4-nitrophenyl, 2,4-dinitrophenyl, 2,6-dinitrophenyl, 4-dimethylaminophenyl, 4-acetylphenyl, methoxyethylphenyl, ethoxymethylphenyl, methylthiophenyl, isopropylthiophenyl or tert-butylthiophenyl or $C_6F_{(5-a)}H_a$ where $0 \leq a \leq 5$.

$C_5$-$C_{12}$-Cycloalkyl which may optionally be substituted by functional groups, aryl, alkyl, aryloxy, alkyloxy, halogen, heteroatoms and/or heterocycles is preferably cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl, $C_nF_{2(n-a)-(1-b)}H_{2a-b}$ where $n \leq 30$, $0 \leq a \leq n$ and b=0 or 1 or a saturated or unsaturated bicyclic system such as norbornyl or norbornenyl.

$C_5$-$C_{12}$-Cycloalkenyl which may optionally be substituted by functional groups, aryl, alkyl, aryloxy, alkyloxy, halogen, heteroatoms and/or heterocycles is preferably 3-cyclopentenyl, 2-cyclohexenyl, 3-cyclohexenyl, 2,5-cyclohexadienyl or $C_nF_{2(n-a)-3(1-b)}H_{2a-3b}$ where $n \leq 30$, $0 \leq a \leq n$ and b=0 or 1.

A five- or six-membered, oxygen-, nitrogen- and/or sulfur-comprising heterocycle which may optionally be substituted by functional groups, aryl, alkyl, aryloxy, alkyloxy, halogen, heteroatoms and/or heterocycles is preferably furyl, thiophenyl, pyrryl, pyridyl, indolyl, benzoxazolyl, dioxolyl, dioxyl, benzimidazolyl, benzthiazolyl, dimethylpyridyl, methylquinolyl, dimethylpyrryl, methoxyfuryl, dimethoxypyridyl or difluoropyridyl.

If two adjacent radicals together form an unsaturated, saturated or aromatic ring which may optionally be substituted by functional groups, aryl, alkyl, aryloxy, alkyloxy, halogen, heteroatoms and/or heterocycles and may optionally be interrupted by one or more oxygen and/or sulfur atoms and/or one or more substituted or unsubstituted imino groups, this is preferably 1,3-propylene, 1,4-butylene, 1,5-pentylene, 2-oxa-1,3-propylene, 1-oxa-1,3-propylene, 2-oxa-1,3-propylene, 1-oxa-1,3-propenylene, 3-oxa-1,5-pentylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

If the abovementioned radicals comprise oxygen and/or sulfur atoms and/or substituted or unsubstituted imino groups, the number of oxygen and/or sulfur atoms and/or imino groups is not subject to any restrictions. In general, there will be no more than 5 in the radical, preferably no more than 4 and very particularly preferably no more than 3.

If the abovementioned radicals comprise heteroatoms, there is generally at least one carbon atom, preferably at least two carbon atoms, between each two heteroatoms.

Particular preference is given to the radicals $R^1$ to $R^9$ each being, independently of one another, hydrogen;

unbranched or branched $C_1$-$C_{18}$-alkyl which may be unsubstituted or substituted by one or more hydroxy, halogen, phenyl, cyano, $C_1$-$C_6$-alkoxycarbonyl and/or sulfonic acid groups and has a total of from 1 to 20 carbon atoms, for example methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, 2-hydroxyethyl, benzyl, 3-phenylpropyl, 2-cyanoethyl, 2-(methoxycarbonyl)ethyl, 2-(ethoxycarbonyl)ethyl, 2-(n-butoxycarbonyl)

ethyl, trifluoromethyl, difluoromethyl, fluoromethyl, pentafluoroethyl, heptafluoropropyl, heptafluoroisopropyl, nonafluorobutyl, nonafluoroisobutyl, undecylfluoropentyl, undecylfluoroisopentyl, 6-hydroxyhexyl and propylsulfonic acid;

glycols, butylene glycols and their oligomers having from 1 to 100 units and a hydrogen or a $C_1$-$C_8$-alkyl as end group, for example $R^A O-(CHR^B-CH_2-O)_n-CHR^B-CH_2-$ or $R^A O-(CH_2CH_2CH_2CH_2O)_n-CH_2CH_2CH_2CH_2O-$ where $R^A$ and $R^B$ are preferably hydrogen, methyl or ethyl and n is preferably from 0 to 3, in particular 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxamidecyl and 3,6,9,12-tetraoxatetradecyl;

vinyl; and

N,N-di-$C_1$-$C_6$-alkylamino, for example N,N-dimethylamino and N,N-diethylamino.

Very particular preference is given to the radicals $R^1$ to $R^9$ each being, independently of one another, hydrogen or $C_1$-$C_{18}$-alkyl, for example methyl, ethyl, 1-butyl, 1-pentyl, 1-hexyl, 1-heptyl, 1-octyl, phenyl, 2-hydroxyethyl, 2-cyanoethyl, 2-(methoxycarbonyl)-ethyl, 2-(ethoxycarbonyl)ethyl, 2-(n-butoxycarbonyl)ethyl, N,N-dimethylamino, N,N-diethylamino, chlorine or $CH_3O-(CH_2CH_2O)_n-CH_2CH_2-$ or $CH_3CH_2O-(CH_2CH_2O)_n-CH_2CH_2-$ where n is from 0 to 3.

Very particularly preferred pyridinium ions (IVa) are those in which
one of the radicals $R^1$ to $R^5$ is methyl, ethyl or chlorine and the remaining radicals $R^1$ to $R^5$ are each hydrogen;
$R^3$ is dimethylamino and the remaining radicals $R^1$, $R^2$, $R^4$ and $R^5$ are each hydrogen;
all radicals $R^1$ to $R^5$ are hydrogen;
$R^2$ is carboxy or carboxamide and the remaining radicals $R^1$, $R^2$, $R^4$ and $R^5$ are each hydrogen; or
$R^1$ and $R^2$ or $R^2$ and $R^3$ together are 1,4-buta-1,3-dienylene and the remaining radicals $R^1$, $R^2$, $R^4$ and $R^5$ are each hydrogen;
and in particular those in which
$R^1$ to $R^5$ are each hydrogen; or
one of the radicals $R^1$ to $R^5$ is methyl or ethyl and the remaining radicals $R^1$ to $R^5$ are each hydrogen.

As very particularly preferred pyridinium ions (IVa), mentioned may be made of 1-methylpyridinium, 1-ethylpyridinium, 1-(1-butyl)pyridinium, 1-(1-hexyl)pyridinium, 1-(1-octyl)pyridinium, 1-(1-hexyl)pyridinium, 1-(1-octyl) pyridinium, 1-(1-dodecyl)pyridinium, 1-(1-tetradecyl) pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethyl pyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethyl-pyridinium and 1-(1-octyl)-2-methyl-3-ethylpyridinium, 1-(1-dodecyl)-2-methyl-3-ethyl-pyridinium, 1-(1-tetradecyl)-2-methyl-3-ethylpyridinium and 1-(1-hexadecyl)-2-methyl-3-ethylpyridinium.

Very particularly preferred pyridazinium ions (IVb) are those in which
$R^1$ to $R^4$ are each hydrogen; or
one of the radicals $R^1$ to $R^4$ is methyl or ethyl and the remaining radicals $R^1$ to $R^4$ are each hydrogen.

Very particularly preferred pyrimidinium ions (IVc) are those in which
$R^1$ is hydrogen, methyl or ethyl and $R^2$ to $R^4$ are each, independently of one another, hydrogen or methyl; or
$R^1$ is hydrogen, methyl or ethyl, $R^2$ and $R^4$ are each methyl and $R^3$ is hydrogen.

Very particularly preferred pyrazinium ions (IVd) are those in which
$R^1$ is hydrogen, methyl or ethyl and $R^2$ to $R^4$ are each, independently of one another, hydrogen or methyl;
$R^1$ is hydrogen, methyl or ethyl, $R^2$ and $R^4$ are each methyl and $R^3$ is hydrogen;
$R^1$ to $R^4$ are each methyl; or
$R^1$ to $R^4$ are each methyl or hydrogen.

Very particularly preferred imidazolium ions (IVe) are those in which
$R^1$ is hydrogen, methyl, ethyl, 1-propyl, 1-butyl, 1-pentyl, 1-hexyl, 1-octyl, 2-hydroxyethyl or 2-cyanoethyl and $R^2$ to $R^4$ are each, independently of one another, hydrogen, methyl or ethyl.

As very particularly preferred imidazolium ions (IVe), mention may be made of 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimi-dazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium and 1,4,5-trimethyl-3-octylimidazolium.

Very particularly preferred pyrazolium ions (IVf), (IVg) and (IVg') are those in which
$R^1$ is hydrogen, methyl or ethyl and $R^2$ to $R^4$ are each, independently of one another, hydrogen or methyl.

Very particularly preferred pyrazolium ions (IVh) are those in which
$R^1$ to $R^4$ are each, independently of one another, hydrogen or methyl.

Very particularly preferred 1-pyrazolinium ions (IVi) are those in which
$R^1$ to $R^6$ are each, independently of one another, hydrogen or methyl. Very particularly preferred 2-pyrazolinium ions (IVj) and (IVj') are those in which
$R^1$ is hydrogen, methyl, ethyl or phenyl and $R^2$ to $R^6$ are each, independently of one another, hydrogen or methyl.

Very particularly preferred 3-pyrazolinium ions (IVk) and (IVk') are those in which
$R^1$ and $R^2$ are each, independently of one another, hydrogen, methyl, ethyl or phenyl and $R^3$ to $R^6$ are each, independently of one another, hydrogen or methyl.

Very particularly preferred imidazolinium ions (IVl) are those in which
$R^1$ and $R^2$ are each, independently of one another, hydrogen, methyl, ethyl, 1-butyl or phenyl, $R^3$ ad $R^4$ are each, independently of one another, hydrogen, methyl or ethyl and $R^5$ and $R^6$ are each, independently of one another, hydrogen or methyl.

Very particularly preferred imidazolinium ions (IVm) and (IVm') are those in which
$R^1$ and $R^2$ are each, independently of one another, hydrogen, methyl or ethyl and $R^3$ to $R^6$ are each, independently of one another, hydrogen or methyl.

Very particularly preferred imidazolinium ions (IVn) and (IVn') are those in which
$R^1$ to $R^3$ are each, independently of one another, hydrogen, methyl or ethyl and $R^4$ to $R^6$ are each, independently of one another, hydrogen or methyl.

Very particularly preferred thiazolium ions (IVo) and (IVo') and oxazolium ions (IVp) are those in which
$R^1$ is hydrogen, methyl, ethyl or phenyl and $R^2$ and $R^3$ are each, independently of one another, hydrogen or methyl.

Very particularly preferred 1,2,4-triazolium ions (IVq), (IVq') and (IVq") are those in which
$R^1$ and $R^2$ are each, independently of one another, hydrogen, methyl, ethyl or phenyl and $R^3$ is hydrogen, methyl or phenyl.

Very particularly preferred 1,2,3-triazolium ions (IVr), (IVr') and (IVr") are those in which
$R^1$ is hydrogen, methyl or ethyl and $R^2$ and $R^3$ are each, independently of one another, hydrogen or methyl or $R^2$ and $R^3$ together are 1,4-buta-1,3-dienylene.

Very particularly preferred pyrrolidinium ions (IVs) are those in which
$R^1$ is hydrogen, methyl, ethyl or phenyl and $R^2$ to $R^9$ are each, independently of one another, hydrogen or methyl.

Very particularly preferred imidazolidinium ions (IVt) are those in which
$R^1$ and $R^4$ are each, independently of one another, hydrogen, methyl, ethyl or phenyl and $R^2$ and $R^3$ and also $R^5$ to $R^8$ are each, independently of one another, hydrogen or methyl.

Very particularly preferred ammonium ions (IVu) are those in which
$R^1$ to $R^3$ are each independently of one another, $C_1$-$C_{18}$-alkyl; or
$R^1$ and $R^2$ together are 1,5-pentylene or 3-oxa-1,5-pentylene and $R^3$ is $C_1$-$C_{18}$-alkyl, 2-hydroxyethyl or 2-cyanoethyl.

As very particularly preferred ammonium ions (IVu), mention may be made of methyltri(1-butyl)ammonium, N,N-dimethylpiperidinium and N,N-dimethylmorpholinium.

Examples of tertiary amines from which the quaternary ammonium ions of the general formula (IVu) are derived by quaternization with the abovementioned radicals R are diethyl-n-butylamine, diethyl-tert-butylamine, diethyl-n-pentylamine, diethylhexylamine, diethyloctylamine, diethyl(2-ethylhexyl)amine, di-n-propylbutylamine, di-n-propyl-n-pentylamine, di-n-propylhexylamine, di-n-propyloctylamine, di-n-propyl(2-ethylhexyl)amine, diisopropylethylamine, diisopropyl-n-propylamine, diisopropylbutylamine, diisopropylpentylamine, diisopropylhexylamine, diisopropyloctylamine, diiso-propyl-(2-ethylhexyl)amine, di-n-butylethylamine, di-n-butyl-n-propylamine, di-n-butyl-n-pentylamine, di-n-butylhexylamine, di-n-butyloctylamine, di-n-butyl(2-ethylhexyl)amine, N-n-butylpyrrolidine, N-sec-butylpyrrolidine, N-tert-butylpyrrolidine, N-n-pentylpyrrolidine, N,N-dimethylcyclohexylamine, N,N-diethylcyclohexylamine, N,N-di-n-butylcyclohexylamine, N-n-propylpiperidine, N-isopropylpiperidine, N-n-butylpiperidine, N-sec-butylpiperidine, N-tert-butylpiperidine, N-n-pentylpiperidine, N-n-butylmorpholine, N-sec-butylmorpholine, N-tert-butylmorpholine, N-n-pentylmorpholine, N-benzyl-N-ethylaniline, N-benzyl-N-n-propylaniline, N-benzyl-N-isopropylaniline, N-benzyl-N-n-butylaniline, N,N-dimethyl-p-toluidine, N,N-diethyl-p-toluidine, N,N-di-n-butyl-p-toluidine, diethylbenzylamine, di-n-propylbenzylamine, di-n-butylbenzylamine, diethylphenylamine, di-n-propylphenylamine and di-n-butylphenylamine.

Preferred tertiary amines (IVu) are diisopropylethylamine, diethyl-tert-butylamine, diisopropylbutylamine, di-n-butyl-n-pentylamine, N,N-di-n-butylcyclohexylamine and also tertiary amines derived from pentylisomers.

Particularly preferred tertiary amines are di-n-butyl-n-pentylamine and tertiary amines derived from pentylisomers. A further preferred tertiary amine which has three identical radicals is triallylamine.

Very particularly preferred guanidinium ions (IVv) are those in which
$R^1$ to $R^5$ are each methyl.

As very particularly preferred guanidinium ions (IVv), mention may be made of N,N,N',N',N",N"-hexamethylguanidinium.

Very particularly preferred cholinium ions (IVw) are those in which
$R^1$ and $R^2$ are each, independently of one another, methyl, ethyl, 1-butyl or 1-octyl and $R^3$ is hydrogen, methyl, ethyl, acetyl, —$SO_2OH$ or —$PO(OH)_2$;
$R^1$ is methyl, ethyl, 1-butyl or 1-octyl, $R^2$ is a —$CH_2$—$CH_2$—$OR^4$ group and $R^3$ and $R^4$ are each, independently of one another, hydrogen, methyl, ethyl, acetyl, —$SO_2OH$ or —$PO(OH)_2$; or
$R^1$ is a —$CH_2$—$CH_2$—$OR^4$ group, $R^2$ is a —$CH_2$—$CH_2$—$OR^5$ group and $R^3$ to $R^5$ are each, independently of one another, hydrogen, methyl, ethyl, acetyl, —$SO_2OH$ or —$PO(OH)_2$.

Particularly preferred cholinium ions (IVw) are those in which $R^3$ is selected from among hydrogen, methyl, ethyl, acetyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

Very particularly preferred phosphonium ions (IVx) are those in which
$R^1$ to $R^3$ are each, independently of one another, $C_1$-$C_{18}$-alkyl, in particular butyl, isobutyl, 1-hexyl or 1-octyl.

Among the abovementioned heterocyclic cations, the pyridinium ions, pyrazolinium, pyrazolium ions and the imidazolinium and the imidazolium ions are preferred. Preference is also given to ammonium ions.

Particular preference is given to 1-methylpyridinium, 1-ethylpyridinium, 1-(1-butyl)pyridinium, 1-(1-hexyl)pyridinium, 1-(1-octyl)pyridinium, 1-(1-hexyl)pyridinium, 1-(1-octyl)pyridinium, 1-(1-dodecyl)pyridinium, 1-(1-tetradecyl)

pyridinium, 1-(1-hexadecyl)pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethyl-pyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium, 1-(1-octyl)-2-methyl-3-ethyl-pyridinium, 1-(1-dodecyl)-2-methyl-3-ethylpyridinium, 1-(1-tetradecyl)-2-methyl-3-ethyl-pyridinium, 1-(1-hexadecyl)-2-methyl-3-ethylpyridinium, 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-hexyl)-3-methylimidazolium, 1-(1-octyl)-3-methylimidazolium, 1-(1-dodecyl)-3-methylimidazolium, 1-(1-tetradecyl)-3-methylimidazolium, 1-(1-hexadecyl)-3-methyl-imidazolium, 1,2-dimethylimidazolium, 1,2,3-trimethylimidazolium, 1-ethyl-2,3-dimethyl-imidazolium, 1-(1-butyl)-2,3-dimethylimidazolium, 1-(1-hexyl)-2,3-dimethylimidazolium and 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium and 1,4,5-trimethyl-3-octylimidazolium.

The metal cations $[M^1]^+$, $[M^2]^+$, $[M^3]^+$, $[M^4]^{2+}$ and $[M^5]^{3+}$ mentioned in the formulae (IIIa) to (IIIj) are generally metal cations of groups 1, 2, 6, 7, 8, 9, 10, 11, 12 and 13 of the Periodic Table. Suitable metal cations are, for example, $Li^+$, $Na^+$, $K^+$, $Cs^+$, $Mg^{2+}$, $Ca^{2+}$, $Ba^{2+}$, $Cr^{3+}$, $Fe^{2+}$, $Fe^{3+}$, $Co^{2+}$, $Ni^{2+}$, $Cu^{2+}$, $Ag^+$, $Zn^{2+}$ and $Al^{3+}$.

As anions, it is in principle possible to use all anions.

The anion $[Y]^{n-}$ of the ionic liquid is, for example, selected from the group of halides and halogen-comprising compounds of the formulae:
Cl—, Br—, I—, $AlCl_4$—, $Al_2Cl_7$—, $Al_3Cl_{10}$—, $AlBr_4$—, $FeCl_4$—, $BCl_4$—, $ZnCl_3$—, $SnCl_3$—, $CuCl_2$—, —$CF_3SO_3$—, $(CF_3SO_3)_2N$—, $CF_3CO_2$—, $CCl_3CO_2$—, CN—, SCN—, OCN— the group of sulfates, sulfites and sulfonates of the general formulae:
$SO_4^{2-}$—, $HSO_4$—, $SO_3^{2-}$—, $HSO_3$—, $R^aOSO_3$—, $R^aSO_3$— the group of phosphates of the general formulae
$PO_4^{3-}$, $HPO_4^{2-}$, $H_2PO_4$—, $R^aPO_4^{2-}$, $HR^aPO_4$—, $R^aR^bPO_4$— the group of phosphonates and phosphinates of the general formulae:
$R^aHPO_3$—, $R^aR^bPO_2$—, $R^aR^bPO_3$— the group of phosphites of the general formulae:
$PO_3^{3-}$, $HPO_3^{2-}$, $H_2PO_3$—, $R^aPO_3^{2-}$, $R^aHPO_3$—, $R^aR^bPO_3$— the group of phosphonites and phosphinites of the general formulae:
$R^aR^bPO_2$—, $R^aHPO_2$—, $R^aR^bPO$—, $R^aHPO$— the group of carboxylic acids of the general formula:
$R^aCOO$— the group of borates of the general formulae:
$BO_3^{3-}$—, $HBO_3^{2-}$—, $H_2BO_3$—, $R^aR^bBO_3$—, $R^aHBO_3$—, $R^aBO_3^{2-}$—, $B(OR^a)(OR^b)(OR^c)(OR^d)$—, $B(HSO_4)$—, $B(R^aSO4)$, with tetrafluoroborate being excluded as anion, the group of boronates of the general formulae:
$R^aBO_2^2$, $R^aR^bBO$— the group of carbonates and carbonic esters of the general formulae:
$HCO_3$—, $CO_3^{2-}$—, $R^aCO_3$— the group of silicates and silicic esters of the general formulae:
$SiO_4^{4-}$—, $HSiO_4^{3-}$—, $H_2SiO_4^{2-}$—, $H_3SiO_4$—, $R^aSiO_4^{3-}$—, $R^aR^bSiO_4^{2-}$—, $R^aR^bR^cSiO_4$—, $HR^aSiO_4^{2-}$—, $H_2R^aSiO_4$—, $HR^aR^bSiO_4$— the group of alkylsilane or arylsilane salts of the general formulae:
$R^aSiO_3^{3-}$—, $R^aR^bSiO_2^{2-}$—, $R^aR^bR^cSiO$—, $R^aR^bR^c-SiO_3$—, $R^aR^bR^cSiO_2$—, $R^aR^bSiO_3^{2-}$— the group of carboimides, bis(sulfonyl)imides and sulfonylimides of the general formulae:

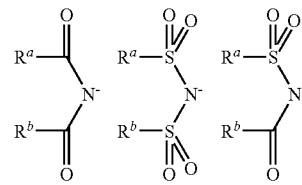

the group of methides of the general formula:

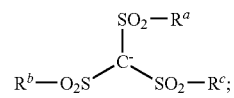

the group of alkoxides and aryloxides of the general formula:
$R^aO$—;

the group of halometalates of the general formula
$[M_qHal_r]^{s-}$—,
where M is a metal and Hal is chlorine, bromine or iodine, q and r are positive integers and indicate the stoichiometry of the complex and s is a positive integer and indicates the charge on the complex;

the group of sulfides, hydrogensulfides, polysulfides, hydrogenpolysulfides and thiolates of the general formulae:
$S^{2-}$—, HS—, $[S_v]^{2-}$—, $[HS_v]$—, $[R^aS]$—,
where v is a positive integer from 2 to 10;

the group of complex metal ions such as $Fe(CN)_6^{3-}$, $Fe(CN)_6^{4-}$, $MnO_4$, $Fe(CO)_4$—.

In these formulae, $R^a$, $R^b$, $R^c$ and $R^d$ are each, independently of one another, hydrogen, $C_1$-$C_{30}$-alkyl, $C_2$-$C_{18}$-alkyl which may optionally be interrupted by one or more nonadjacent oxygen and/or sulfur atoms and/or one or more substituted or unsubstituted imino groups, $C_6$-$C_{14}$-aryl, $C_5$-$C_{12}$-cycloalkyl or a five- or six-membered, oxygen-, nitrogen- and/or sulfur-comprising heterocycle, where two of them may together form an unsaturated, saturated or aromatic ring which may optionally be interrupted by one or more oxygen and/or sulfur atoms and/or one or more unsubstituted or substituted imino groups, where the radicals mentioned may each be additionally substituted by functional groups, aryl, alkyl, aryloxy, alkyloxy, halogen, heteroatoms and/or heterocycles.

Here, $C_1$-$C_{18}$-alkyl which may optionally be substituted by functional groups, aryl, alkyl, aryloxy, alkyloxy, halogen, heteroatoms and/or heterocycles is, for example, methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, benzyl, 1-phenylethyl, α,α-dimethylbenzyl, benzhydryl, p-tolylmethyl, 1-(p-butylphenyl)ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di(methoxycarbonyl)ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, trichloromethyl, trifluoromethyl, 1,1-dimethyl-2-chloroethyl, 2-methoxyisopropyl, 2-ethoxyethyl, butylthiomethyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 4-aminobutyl, 6-aminohexyl, 2-methylaminoethyl, 2-methylaminopropyl, 3-methylaminopropyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl.

$C_2$-$C_{18}$-Alkyl which may optionally be interrupted by one or more nonadjacent oxygen and/or sulfur atoms and/or one or more substituted or unsubstituted imino groups is, for example, 5-hydroxy-3-oxapentyl, 8-hydroxy-3,6-dioxaoctyl, 11-hydroxy-3,6,9-trioxaundecyl, 7-hydroxy-4-oxaheptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10-oxatetradecyl.

If two radicals form a ring, these radicals can together be, for example as fused-on building block, 1,3-propylene, 1,4-butylene, 2-oxa-1,3-propylene, 1-oxa-1,3-propylene, 2-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of nonadjacent oxygen and/or sulfur atoms and/or imino groups is in principle not subject to any restrictions or is automatically restricted by the size of the radical or the ring building block. In general, there will be no more than 5 in the respective radical, preferably no more than 4 and very particularly preferably no more than 3. Furthermore, there is generally at least one carbon atom, preferably at least two carbon atoms, between each two heteroatoms.

Substituted and unsubstituted imino groups can be, for example, imino, methylimino, isopropylimino, n-butylimino or tert-butylimino.

The term "functional groups" refers, for example, to the following: carboxy, carboxamide, hydroxy, di($C_1$-$C_4$-alkyl)amino, $C_1$-$C_4$-alkyloxycarbonyl, cyano or $C_1$-$C_4$-alkoxy. Here, $C_1$-$C_4$-alkyl is methyl, ethyl, propyl, isopropyl, n-butyl, sec-butyl or tert-butyl.

$C_6$-$C_{14}$-Aryl which may optionally be substituted by functional groups, aryl, alkyl, aryloxy, alkyloxy, halogen, heteroatoms and/or heterocycles is, for example, phenyl, tolyl, xylyl, α-naphthyl, β-naphthyl, 4-diphenylyl, chlorophenyl, dichlorophenyl, trichlorophenyl, difluorophenyl, methylphenyl, dimethylphenyl, trimethylphenyl, ethylphenyl, diethylphenyl, isopropylphenyl, tert-butylphenyl, dodecylphenyl, methoxyphenyl, dimethoxyphenyl, ethoxyphenyl, hexyloxyphenyl, methylnaphthyl, isopropylnaphthyl, chloronaphthyl, ethoxynaphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl.

$C_5$-$C_{12}$-Cycloalkyl which may optionally be substituted by functional groups, aryl, alkyl, aryloxy, alkyloxy, halogen, heteroatoms and/or heterocycles is, for example, cyclopentyl, cyclohexyl, cyclooctyl, cyclododecyl, methylcyclopentyl, dimethylcyclopentyl, methylcyclohexyl, dimethylcyclohexyl, diethylcyclohexyl, butylcyclohexyl, methoxycyclohexyl, dimethoxycyclohexyl, diethoxycyclohexyl, butylthiocyclohexyl, chlorocyclohexyl, dichlorocyclohexyl, dichlorocyclopentyl or a saturated or unsaturated bicyclic system such as norbornyl or norbornenyl.

A five- or six-membered, oxygen-, nitrogen- and/or sulfur-comprising heterocycle is, for example, furyl, thiophenyl, pyryl, pyridyl, indolyl, benzoxazolyl, dioxolyl, dioxyl, benzimidazolyl, benzthiazolyl, dimethylpyridyl, methylquinolyl, dimethylpyryl, methoxyfuryl, dimethoxypyridyl, difluoropyridyl, methylthiophenyl, isopropylthiophenyl or tert-butylthiophenyl.

For the purposes of the invention, substances having a soft cation and/or a soft anion are preferably used as ionic liquid. This means that cations and/or anions are well stabilized, for example by inductive and/or mesomeric effects. Cations preferably have electron-pushing substituents. The cation preferably comprises exclusively electron-pushing substituents. The anion preferably has electron-pulling substituents. Particular preference is given to using an ionic liquid in which the charge on the cation, on the anion or on the cation and the anion is localized by means of mesomeric effects. Preferred cations are therefore imidazolium, guanidinium or pyrazolium derivatives. Ionic liquids used according to the invention particularly preferably have cations selected from the group consisting of 1,2,3-trimethylimidazolium, 1,3,4,5-tetramethylimidazolium, 1,3,4-dimethylimidazolium, 1,3,4-trimethylimidazolium, 1,3-dibutyl-2-methylimidazolium, 1,3-dibutylimidazolium, 1,2-dimethylimidazolium, 1,3-dimethylimidazolium, 1-benzyl-3-methylimidazolium, 1-butyl-2,3-dimethylimidazolium, 1-butyl-2-ethyl-5-methylimidazolium, 1-butyl-2-ethylimidazolium, 1-butyl-2-methylimidazolium, 1-butyl-3,4,5-trimethylimidazolium, 1-butyl-3,4-dimethylimidazolium, 1-butyl-3-ethylimidazolium, 1-butyl-3-methylimidazolium, 1-butyl-4-methylimidazolium, 1-butylimidazolium, 1-decyl-3-methylimidazolium, 1-dodecyl-3-methylimidazolium, 1-ethyl-2,3-dimethylimidazolium, 1-ethyl-3-methylimidazolium, 1-hexadecyl-2,3-dimethylimidazolium, 1-hexadecyl-3-methylimidazolium, 1-hexyl-2,3-dimethylimidazolium, 1-hexyl-3-methylimidazolium, 1-methyl-2-ethylimidazolium, 1-methyl-3-octylimidazolium, 1-methylimidazolium, 1-pentyl-3-methylimidazolium, 1-phenylpropyl-3-methylimidazolium, 1-propyl-2, 3-dimethylimidazolium, 1-tetradecyl-3-methylimidazolium, 2,3-dimethylimidazolium, 2-ethyl-3,4-dimethylimidazolium, 3,4-dimethylimidazolium, 1,2-dimethylpyridinium, guanidinium, hexamethylguanidinium, N,N,N',N'-tetramethyl-N''-ethylguanidinium, N-pentamethyl-N-isopropylguanidinium, N-pentamethyl-N-propylguanidinium, benzyltriphenylphosphonium, tetrabutylphosphonium, trihexyl(tetradecyl)phosphonium and triisobutyl(methyl)phosphonium.

Even more preferred cations are selected from the group consisting of 1,2,3-trimethylimidazolium, 1,2-dimethylimidazolium, 1-butyl-2-methylimidazolium, 1-butyl-4-methylimidazolium, 1,3-diethylimidazolium, 1-benzyl-3-methylimidazolium, 1-butyl-2,3-dimethylimidazolium, 1-butyl-2-methylimidazolium, 1-butyl-3-ethylimidazolium, 1-butyl-3-methylimidazolium, 1-butylimidazolium, 1-ethyl-2,3-dimethylimidazolium, 1-ethyl-3-methylimidazolium, 1-hexyl-3-methylimidazolium, 1-methyl-2-ethylimidazolium, 1-methyl-3-octylimidazolium, 1-methylimidazolium, 1-decyl-3-methylimidazolium, 1-dodecyl-3-methylimidazolium, guanidinium, N,N,N',N'-tetramethyl-N''-ethylguanidinium, benzyltriphenylphosphonium and tetrabutylphosphonium.

In particular, the cations are selected from the group consisting of 1,2,3-trimethylimidazolium, 1,2-dimethylimidazolium, 1-butyl-2,3-dimethylimidazolium, 1-butyl-3-methylimidazolium, 1-ethyl-2,3-dimethylimidazolium, 1-ethyl-3-methylimidazolium, 1-butylimidazolium and 1-methylimidazolium. In the process of the invention, the anions are preferably selected from the group consisting of acetate, bis(2,4,4-trimethylpentyl)phosphinate, bis(malonato)borate, bis(oxalato)borate, bis(phthalato)borate, bis(salicylato)borate, bis(trifluoromethane-sulfonyl)imidate, bis(trifluoromethyl)imidate, borate, bromide, bromoaluminates, carbonate, chloroaluminates, decylbenzenesulfonate, dichlorocuprate, dicyanamide, didecylbenzenesulfonate, didodecylbenzenesulfonate, diethylphosphate, dihydrogenphosphate, dodecylbenzenesulfonate, ethylsulfate, ethylsulfonate, hydrogencarbonate, hydrogenphosphate, hydrogensulfate, hydrogensulfite, iodide, methylsulfate, methylsulfonate, nitrate, nitrite, phosphate, sulfite, tetracyanoborate, tetrakis(hydrogensulfato)borate, tetrakis(methylsulfonato)borate, thiocyanate, tosylate, trichlorozincate, trifluoroacetate, trifluoromethylsulfonate.

To prepare the DMC catalysts, the metal salt and the cyanometalate compound are dissolved or suspended in the ionic liquids and the solutions or suspensions are reacted with one another.

As metal salts, preference is given to using compounds of the general formula (VI)

$$M^1_g X_n \qquad (VI)$$

where
$M^1$ is a metal ion selected from the group consisting of $Zn^{2+}$, $Fe^{2+}$, $Fe^{3+}$, $Co^{2+}$, $Co^{3+}$, $Ni^{2+}$, $Mn^{2+}$, $Sn^{2+}$, $Sn^{4+}$, $Pb^{2+}$, $Al^{3+}$, $Sr^{2+}$, $Cr^{3+}$, $Cd^{2+}$, $Cu^{2+}$, $La^{3+}$, $Ce^{3+}$, $Ce^{4+}$, $Eu^{3+}$, $Mg^{2+}$, $Ti^{4+}$, $Ag^+$, $Ru^{2+}$, $Ru^{2+}$, $Ru^{3+}$, $Pd^{2+}$ X is an anion selected from the group consisting of halide, hydroxide, sulfate, hydrogensulfate, carbonate, hydrogencarbonate, cyanide, thiocyanate, isocyanate, cyanate, carboxylate, oxalate, nitrate and nitrite ($NO_2$—) or a mixture of two or more of the abovementioned anions or a mixture of one or more of the abovementioned anions with an uncharged species selected from among CO, $H_2O$ and NO, g, n, are selected so that the compound is electrically neutral.

As cyanometalate compounds, preference is given to using compounds of the general formula (V)

$$M^3_r[M^2(CN)_b]_d, \qquad (V)$$

where
$M^2$ is a metal ion selected from the group consisting of $Fe^{2+}$, $Fe^{3+}$, $Co^{2+}$, $Co^{3+}$, $Mn^{2+}$, $Mn^{3+}$, $Ni^{2+}$, $Cr^{2+}$, $Cr^{3+}$, $Rh^{3+}$, $Ru^{2+}$, $Ir^{3+}$ and $M^1$ and $M^2$ are identical or different,
$M^3$ is hydrogen or an alkali metal or alkaline earth metal or ammonium $[NR_4]^+$ where R=hydrogen, alkyl or aryl,
b, d, are selected so that the compound is electrically neutral.

Whether a solution or suspension is employed depends on the solubility of the component in the ionic liquid. The two procedures can be considered to be of equal utility for the purposes of the present invention.

To carry out the process of the invention, a solution or suspension of a compound (V) in an ionic liquid is combined with the solution or suspension of a metal salt (VI) in an ionic liquid. Here, a stoichiometric excess of the metal salt can be employed. The reaction is preferably carried out at a molar ratio of the metal ion to the cyanometalate component of from 1.1 to 7.0, preferably from 1.2 to 5.0 and particularly preferably from 1.3 to 3.0. It is advantageous to place the metal salt solution in a reaction vessel and to add the cyanometalate compound, but the reverse procedure can also be used. Good mixing, for example by means of stirring, is necessary during and after the combination of the starting solutions.

The content of the compound (V) in the solution based on the mass of the solution is from 0.1 to 30% by weight, preferably from 0.1 to 20% by weight, in particular from 0.2 to 10% by weight. The content of the metal salt component in the metal salt solution based on the mass of metal salt solution is from 0.1 to 50% by weight, preferably from 0.2 to 40% by weight, in particular from 0.5 to 30% by weight.

At least one of the solutions of the starting materials can comprise a heteroatom-comprising ligand as is denoted as L and explained in the general formula (VI). The heteroatom-comprising ligands can also be added to the suspension formed after the two starting solutions have been combined, with good mixing also having to be ensured here.

The content of the heteroatom-comprising ligands in the suspension formed after the precipitation should be from 1 to 60% by weight, preferably from 5 to 40% by weight, in particular from 10 to 30% by weight.

To set the morphology of the multimetal cyanide compounds, it has been found to be useful to carry out the preparation of these compounds in the presence of surface-active substances. The surface-active substances are generally initially present in at least one of the two solutions. The surface-active substances are preferably added to the solution which is initially placed in the reaction vessel for the precipitation. The content of surface-active substances in the precipitation suspension based on the total mass of the precipitation suspension is preferably from 0.01 to 40% by weight, in particular from 0.05 to 30% by weight. A further preferred embodiment provides for the surface-active substances to be divided among the two starting solutions.

After the precipitation, the multimetal cyanide compounds produced in this way can be separated off from the precipitation suspension, for example by filtration or centrifugation. This separation can then be followed by washing of the multimetal cyanide compounds one or more times. Washing can be carried out using ionic liquids or "conventional" organic solvents such as alcohols, alkanes, haloalkanes, nitriles, ethers, esters, etc. Washing can be carried out on the separation apparatus (e.g. filtration apparatus) itself or in separate apparatuses by, for example, resuspension of the multimetal cyanide compound in washing liquid and renewed separation from the liquid. This washing can be carried out at temperatures of from 10° C. to 180° C., preferably from 15° C. to 60° C.

The multimetal cyanide compound obtained in this way is separated off, for example by means of filtration or centrifugation and, if appropriate, for example when washing has been carried out using a "conventional" organic solvent, dried. Drying can be carried out at ambient pressure or reduced pressure at temperatures from ambient temperature to 120° C. in apparatuses known to those skilled in the art which are suitable for this purpose.

The DMC catalysts prepared by the process of the invention preferably have a structure which can be described by the general formula (VII)

where IL is the ionic liquid and L is the solvent used for washing and the other symbols have the above-described meanings and x, y, z are selected so that the compound is electrically neutral and x and z are greater than zero, y can also be greater than zero and h and k can each be from 0.01 to 10.

The DMC catalysts prepared by the process of the invention can be crystalline, partially crystalline or amorphous.

The DMC catalysts of the invention are used as catalysts for preparing polyether alcohols. Here, the DMC catalysts can be used as powder or in the form of a suspension, in particular in an alcohol. Alcohols used for suspending the catalysts are in particular polyhydric alcohols or polyether alcohols. Particular preference is given to using the alcohols which are used as starter substances for the preparation of the polyether alcohols.

In particular, polyether alcohols having functionalities of from 1 to 8, preferably from 1 to 6 and molar masses $M_w$ of from 500 to 50 000, preferably from 800 to 15 000, are prepared by addition of alkylene oxides onto H-functional starter substances in the presence of the DMC catalysts of the invention. The catalyst concentrations employed are less than 1% by weight, preferably less than 0.5% by weight, particularly preferably less than 1000 ppm, in particular less than 500 ppm, especially preferably less than 100 ppm, based on the total mass of the polyetherol. The preparation of the polyetherols can be carried out either continuously or batchwise. The temperatures used in the synthesis are in the range from 50° C. to 200° C., with temperatures in the range from 90° C. to 150° C. being preferred.

To produce the polyether alcohols using the catalysts of the invention, it is possible to employ compounds having a least one epoxy group, for example ethylene oxide, 1,2-epoxypropane (propylene oxide), 1,2-methyl-2-methylpropane, 1,2-epoxybutane (butylene oxide), 2,3-epoxybutane, 1,2-methyl-3-methylbutane, 1,2-epoxypentane, 1,2-methyl-3-methylpentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, styrene oxide, 1,2-epoxycyclopentane, 1,2-epoxycyclohexane, (2,3-epoxypropyl)benzene, vinyloxiran, 3-phenoxy-1,2-epoxypropane, 2,3-epoxymethyl ether, 2,3-epoxyethyl ether, 2,3-epoxyisopropyl ether, 2,3-epoxy-1-propanol, 3,4-epoxybutyl stearate, 4,5-epoxypentyl acetate, 2,3-epoxypropyl methacrylate, 2,3-epoxypropyl acrylate, gylcidyl butyrate, methyl glycidate, ethyl 2,3-epoxybutanoate, 4-(trimethylsilyl)butane 1,2-epoxide, 4-(triethylsilyl)butane 1,2-epoxide, 3-(perfluoromethyl)propene oxide, 3-(perfluoroethyl)propene oxide, 3-(perfluorobutyl)propene oxide, 4-(2,3-epoxypropyl)morpholine, 1-(oxiran-2-ylmethyl)pyrrolidin-2-one and also any mixtures of these with one another.

Preference is given to ethylene oxide, propylene oxide, butylene oxide, styrene oxide, vinyloxiran and any mixtures of these with one another, in particular ethylene oxide, propylene oxide and mixtures of ethylene oxide and propylene oxide.

The polyether alcohols prepared according to the invention usually have a functionality of from 2 to 8, preferably from 2 to 4 and in particular from 2 to 3, and an equivalent weight of greater than 500 g/mol. Starter substances used are higher-functional starter substances, in particular sugar alcohols, for example sorbitol, hexitol and sucrose, but usually bifunctional and/or trifunctional alcohols or water, either as individual substance or as a mixture of at least 2 of the starter substances mentioned. Examples of bifunctional starter substances are ethylene glycol, diethylene glycol, propylene glycol, dipropylene glycol, 1,4-butanediol and 1,5-pentanediol. Examples of trifunctional starter substances are trimethylolpropane, pentaerythritol and in particular glycerol. The starter substances can also be used in the form of alkoxylates, in particular those having a molecular weight $M_w$ in the range from 62 to 15 000 g/mol. These alkoxylates can be prepared in a separate process step, and it is also possible to use catalysts other than multimetal cyanide compounds, for example alkali metal hydroxides, for preparing them. When alkali metal hydroxides are used for preparing the alkoxylates, it is necessary to remove the catalyst virtually completely, since alkali metal hydroxides can deactivate the multimetal cyanide catalysts. The advantage of using alkoxylates as starter substances is the more rapid commencement of the reaction, but disadvantages are the introduction of an additional process step and, as indicated, possibly the complicated purification of the alkoxylate.

In a preferred embodiment of the preparation of the polyether alcohols, these have a block of pure ethylene oxide units which is particularly preferably located at the end of the chain.

The catalysts prepared by the process of the invention surprisingly also allow incorporation of pure ethylene oxide units in the polyether chain, in particular at the end of the chain.

The direct introduction of an end block composed of ethylene oxide units by means of the DMC catalysts of the invention represents a simplified mode of operation because the additional step of changing the catalyst is dispensed with. The addition of, for example, aqueous potassium hydroxide solution and the subsequent removal of the water is therefore not necessary before the further reaction with ethylene oxide.

Polyether alcohols having an end block composed of ethylene oxide units are particularly important for molded foam applications. As a result of the end block of ethylene oxide units, the polyols have, because of the large number of primary OH groups, a significantly increased reactivity and the subsequent reaction with the isocyanate component proceeds significantly more quickly. To produce molded flexible polyurethane foams, the two components polyetherol and isocyanate are injected into an if appropriate preheated mold which has a complex geometry. To achieve a very short demolding time, rapid reaction of the components is therefore necessary.

The invention is illustrated by the following examples:

EXAMPLES

In carrying out the examples, all solvents used were dried over molecular sieves (3A).

a) Catalyst Preparation

Example 1

5.5 g of hexacyanocobaltic acid were dissolved in 50 g of butylmethylimidazolium acetate (BMIM OAc) at 90° C. 9.0 g of ZnSO$_4$.H$_2$O were dissolved in 50 g of BMIM OAc at 110° C. and added dropwise via a heated dropping funnel (110° C.) to the hexacyanocobaltic acid solution in a glass beaker over a period of 10 minutes. The reaction mixture was stirred at 90° C. for 90 minutes. After cooling and addition of 1200 g of methanol, the suspension formed was stored overnight at 5° C. and subsequently centrifuged. The product was then resuspended in 370 g of methanol, centrifuged off again and then dried at 40° C. in air for 48 hours. The DMC catalyst obtained in this way comprised, according to elemental analysis, 9.6% of Co, 20.7% of Zn and 34.4% of C.

Example 2

6.5 g of hexacyanocobaltic acid were dissolved in 50 g of methylimidazolium chloride (HMIM Cl) at 90° C. 37.9 g of zinc stearate were suspended in 120 g of HMIM Cl and added a little at a time to the hexacyanocobaltic acid solution in a glass beaker over a period of 10 minutes. The reaction mixture was stirred at 90° C. for 90 minutes. After cooling and addition of 1300 g of methanol, the suspension formed was stored overnight at 5° C. and subsequently filtered. The product was then resuspended six times in 400 ml each time of methanol, filtered off each time and then dried at 60° C. under reduced pressure for 16 hours. The DMC catalyst obtained in this way comprised, according to elemental analysis 6.5% of Co, 13.9% of Zn and 48.1% of C.

b) Preparation of Polyether Alcohols

Example 3

A 5.8% strength catalyst suspension in a triol/diol mixture which had been propoxylated by means of DMC technology to an OH number of about 142 mg of KOH/g and from which the catalyst had been completely removed by means of a Seitz deep bed filter was prepared by addition of the necessary amount of DMC catalyst from example 1 to the triol/diol mixture. The suspension obtained was homogenized by means of a Turrax (model: Ultra Turrax T25, manufacturer: IKA) on the lowest setting (11 000 rpm) for 10-15 minutes. The suspension obtained was freed of water at 80-100° C. under a low vacuum on a rotary evaporator for 6-12 hours.

0.32 g of the suspension was placed in an autoclave and admixed with 70.0 g of the triol/diol mixture. The reactor was closed, evacuated and a pressure of from 400 to 800 mbara was set by means of nitrogen. The stirrer was operated at a speed of 500 rpm. The mixture was heated to 130° C. and nitrogen was injected to a pressure of from 3 to 4 bara. After a successful pressure test for 15 minutes, the autoclave was vented into the extraction and evacuated to from 10 to 50 mbara. The reaction mixture was subsequently reacted with 161.4 ml (134.2 g) of propylene oxide. For this purpose, 25 ml of the total amount of propylene oxide were firstly added at a flow rate of 2.5 ml/min in order to ensure commencement of the reaction. The reaction commencement temperature was about 150° C. at a pressure of 2.35 bara. After the temperature had been brought back to 130° C., the flow rate of propylene oxide was gradually increased in the second stage and the remaining 136.4 ml of propylene oxide were metered in. After all the propylene oxide had been added, the reaction mixture was reacted further in an after-reaction (about 2 h) to a constant end pressure of 1.55 bara. The OH number of the end product obtained was 51.2 mg KOH/g. The viscosity was 567 mPa·s and the DMC content was 106 ppm.

Example 4

A 5.18% strength catalyst suspension of the catalyst from example 2 in the triol/diol mixture was prepared as described in example 3. 2.00 g of this were placed in an autoclave and admixed with 70.0 g of the triol/diol mixture. The reaction mixture was firstly treated with 25 ml of propylene oxide as described in example 3 at a flow rate of 2.5 ml/min at 130° C. to ensure commencement of the reaction. The reaction commencement temperature was about 150° C. and the pressure was 3.15 bara. In the second stage, a pressure of 3.7 bar was firstly set by means of nitrogen at 130° C. for safety reasons. 132.0 ml (117.05 g) of ethylene oxide were subsequently metered in at a flow rate in the range from 0.8 ml/min to 1.5 ml/min. After all the ethylene oxide had been added, the reaction mixture was reacted further in an after-reaction (about 11.5 h) to a constant end pressure of 4.46 bara. The OH number of the end product obtained was 52.1 mg KOH/g. The viscosity was 1783 mPa·s and the DMC content was 565 ppm. $^1$H NMR analysis indicated a total proportion of about 46% of propylene oxide and about 54% of ethylene oxide in the product and the content of primary OH groups was 88% (reaction with trichloroacetyl isocyanate and $^1$H NMR).

The invention claimed is:

1. A process for preparing a DMC catalyst comprising
    reacting a cyanometalate compound with a metal salt, wherein the reacting is carried out in a solvent or a suspension media consisting of an ionic liquid to form a precipitation suspension comprising the DMC catalyst, and
    separating the DMC catalyst from the precipitation suspension.

2. The process according to claim 1, wherein the ionic liquid has a melting point below 100° C.

3. The process according to claim 1, wherein the ionic liquid has a melting point below 80° C.

4. The process according to claim 1, wherein the ionic liquid has a melting point below 50° C.

5. The process according to claim 1, wherein the ionic liquid has at least one cation and at least one anion, where at least one of the cation and the anion is organic.

6. The process according to claim 2, wherein a cation of the ionic liquid is organic.

7. The process according to claim 2, wherein an anion of the ionic liquid is organic.

8. The process according to claim 1, wherein the ionic liquid is represented by formula (I)

$$[A]_n^+[Y]^{n-} \quad (I),$$

where
  n is 1, 2, 3 or 4,
  [A]$^+$ is a quaternary ammonium cation, an oxonium cation, a sulfonium cation or a phosphonium cation and
  [Y]$^{n-}$ is a monovalent, divalent, trivalent or tetravalent anion.

9. The process according to claim 1, wherein the ionic liquid is represented by one of formulae (IIa), (IIb), or (IIc)

$$[A^1]^+[A^2]^+[Y]^{n-} \quad (IIa),$$

where n=2;

$$[A^1]^+[A^2]^+[A^3]^+[Y]^{n-} \quad (IIb),$$

where n=3; or $$[A^1]^+[A^2]^+[A^3]^+[A^4]^+[Y]^{n-} \quad (IIc),$$

where n=4,
where
each of $[A^1]^+$, $[A^2]^+$, $[A^3]^+$ and $[A^4]^+$ is a quaternary ammonium cation, an oxonium cation, a sulfonium cation or a phosphonium cation, and
$[Y]^{n-}$ is a monovalent, divalent, trivalent or tetravalent anion.

10. The process according to claim 1, wherein the ionic liquids are represented by one of general formulae (IIIa), (IIIb), (IIIc), (IIId), (IIIe), (IIIf), (IIIg), (IIIh), (IIIi), or (IIIj)

$$[A^1]^+[A^2]^+[A^3]^+[M^1]^+[Y]^{n-} \quad (IIIa),$$

where n=4;

$$[A^1]^+[A^2]^+[M^1]^+[M^2]^+[Y]^{n-} \quad (IIIb),$$

where n=4;

$$[A^1]^+[M^1]^+[M^2]^+[M^3]^+[Y]^{n-} \quad (IIIc),$$

where n=4;

$$[A^1]^+[A^2]^+[M^1]^+[Y]^{n-} \quad (IIId),$$

where n=3;

$$[A^1]^+[M^1]^+[M^2]^+[Y]^{n-} \quad (IIIe),$$

where n=3;

$$[A^1]^+[M^1]^+[Y]^{n-} \quad (IIIf),$$

where n=2;

$$[A^1]^+[A^2]^+[M^4]^{2+}[Y]^{n-} \quad (IIIg),$$

where n=4;

$$[A^1]^+[M^1]^+[M^4]^{2+}[Y]^{n-} \quad (IIIh),$$

where n=4;

$$[A^1]^+[M^5]^{3+}[y]^{n-} \quad (IIIi),$$

where n=4; or $$[A^1]^+[M^4]^{2+}[y]^{n-} \quad (IIIj),$$

where n=3,
where
each of $[A^1]^+$, $[A^2]^+$, $[A^3]^+$ and $[A^4]^+$ is a quaternary ammonium cation, an oxonium cation, a sulfonium cation or a phosphonium cation,
$[Y]^{n-}$ is a monovalent, divalent, trivalent or tetravalent anion,
each of $[M^1]^+$, $[M^2]^+$, $[M^3]^+$ is a monovalent metal cation,
$[M^4]^{2+}$ is a divalent metal cation and
$[M^5]^{3+}$ is a trivalent metal cation.

11. The process according to claim 1, wherein the metal salt is represented by formula (VI), $$M^1_g X_n \quad (VI)$$

where
$M^1$ is a metal ion selected from the group consisting of $Zn^{2+}$, $Fe^{2+}$, $Fe^{3+}$, $Co^{2+}$, $Co^{3+}$, $Ni^{2+}$, $Mn^{2+}$, $Sn^{2+}$, $Sn^{4+}$, $Pb^{2+}$, $Al^{3+}$, $Sr^{2+}$, $Cr^{3+}$, $Cd^{2+}$, $Cu^{2+}$, $La^{3+}$, $Ce^{3+}$, $Ce^{4+}$, $Eu^{3+}$, $Mg^{2+}$, $Ti^{4+}$, $Ag^+$, $Rh^{2+}$, $Ru^{2+}$, $Ru^{3+}$, and $Pd^{2+}$ X is an anion selected from the group consisting of halide, hydroxide, sulfate, hydrogensulfate, carbonate, hydrogencarbonate, cyanide, thiocyanate, isocyanate, cyanate, carboxylate, oxalate, nitrate and nitrite ($NO_2^-$), or a mixture of two or more of the abovementioned anions or a mixture of one or more of the abovementioned anions with an uncharged species selected from the group consisting of CO, $H_2O$ and NO, and
g, n, are selected so that the compound is electrically neutral.

12. The process according to claim 1, wherein the cyanometalate compounds is represented by formula (V), $$M^3_r[M^2(CN)_b]_d, \quad (V),$$

where
$M^2$ is a metal ion selected from the group consisting of $Fe^{2+}$, $Fe^{3+}$, $Co^{2+}$, $Co^{3+}$, $Mn^{2+}$, $Mn^{3+}$, $Ni^{2+}$, $Cr^{2+}$, $Cr^{3+}$, $Rh^{3+}$, $Ru^{2+}$, and $Ir^{3+}$ and $M^1$ and $M^2$ are identical or different,
$M^3$ is hydrogen or an alkali metal or alkaline earth metal or ammonium $[NR_4]^+$ where R=hydrogen, alkyl or aryl, and
b, d, are selected so that the compound is electrically neutral.

13. The process according to claim 5, wherein the cation of the ionic liquid is organic.

14. The process according to claim 5, wherein the anion of the ionic liquid is organic.

15. The process according to claim 1, wherein the reacting is carried out in the absence of water.

16. The process according to claim 1, wherein both the reacting and the separating are carried out in the absence of water.

17. The process of claim 1, wherein the reacting forms a precipitation suspension comprising the DMC catalyst and which is free of water.

18. The process according to claim 1, wherein the ionic liquid is an imidazolium compound.

19. The process of claim 1, wherein the reacting is carried out in a solvent consisting of the ionic liquid.

20. The process of claim 1, wherein the reacting is carried out in a suspension medium consisting of the ionic liquid.

21. The process of claim 1, wherein the cyanometalate compound is reacted with the metal salt by mixing a solution or suspension of the cyanometalate compound in the ionic liquid, wherein the cyanometalate compound is present in the ionic liquid in an amount of 0.1 to 30% by weight, with a solution or suspension of the metal salt in the ionic liquid, wherein the metal salt is present in an amount of from 0.1 to 50% by weight in the ionic liquid.

22. The process of claim 1, wherein the cyanometalate compound and the metal salt are present in the ionic liquid during the reacting in an amount of from 0.1 to 80% by weight based on the total weight of the ionic liquid, the cyanometalate compound and the metal salt.

* * * * *